US008547875B2

(12) United States Patent
Adams et al.

(10) Patent No.: US 8,547,875 B2
(45) Date of Patent: Oct. 1, 2013

(54) NETWORK LAYER TOPOLOGY MANAGEMENT FOR MOBILE AD-HOC NETWORKS AND ASSOCIATED METHODS

(75) Inventors: Stanley Laytar Adams, Harbor Beach, FL (US); Joseph Bibb Cain, Indialantic, FL (US); Keith Andrew Olds, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 528 days.

(21) Appl. No.: 12/748,757

(22) Filed: Mar. 29, 2010

(65) Prior Publication Data
US 2011/0235550 A1 Sep. 29, 2011

(51) Int. Cl.
*H04W 40/30* (2009.01)
*H04L 29/06* (2006.01)

(52) U.S. Cl.
USPC ........... 370/255; 370/395.21; 370/395.3; 709/220; 709/223

(58) Field of Classification Search
USPC .............. 370/254, 328, 351, 255, 395.3
See application file for complete search history.

(56) References Cited

U.S. PATENT DOCUMENTS

| | | | |
|---|---|---|---|
| 5,412,654 A | 5/1995 | Perkins | 370/94.1 |
| 6,304,556 B1 | 10/2001 | Haas | 370/254 |
| 6,754,192 B2 | 6/2004 | Kennedy | 370/331 |
| 6,763,013 B2 | 7/2004 | Kennedy | 370/338 |
| 7,177,295 B1 * | 2/2007 | Sholander et al. | 370/338 |
| 7,349,362 B2 * | 3/2008 | Belcea | 370/321 |
| 7,453,864 B2 * | 11/2008 | Kennedy et al. | 370/351 |
| 7,720,074 B2 * | 5/2010 | Chewning et al. | 370/395.21 |
| 7,852,831 B2 * | 12/2010 | Akbar | 370/352 |
| 8,094,583 B2 * | 1/2012 | Parker et al. | 370/254 |
| 2002/0097711 A1 * | 7/2002 | Curry et al. | 370/352 |
| 2004/0162115 A1 * | 8/2004 | Smith et al. | 455/562.1 |
| 2004/0203820 A1 | 10/2004 | Billhartz | 455/452.1 |
| 2004/0218548 A1 * | 11/2004 | Kennedy et al. | 370/254 |
| 2005/0053003 A1 | 3/2005 | Cain et al. | 370/235 |
| 2005/0073964 A1 * | 4/2005 | Schmidt et al. | 370/260 |
| 2008/0170513 A1 * | 7/2008 | Niranjan et al. | 370/256 |
| 2008/0298251 A1 * | 12/2008 | Khuu et al. | 370/238 |
| 2010/0254312 A1 * | 10/2010 | Kennedy | 370/328 |

OTHER PUBLICATIONS

"Open Shortest Path First (OSPF)", pp. 1-12, Wikipedia, Aug. 29, 2009, available at http://en.wikipedia.org/wiki/OSPF.
"HNW—Highband Networking Waveform", 2 pages, Harris Corporation, Government Communications Systems Division, 2009.

(Continued)

*Primary Examiner* — Hassan Kizou
*Assistant Examiner* — Emmanuel Maglo
(74) *Attorney, Agent, or Firm* — Allen, Dyer, Doppelt, Milbrath & Gilchrist, P.A.

(57) ABSTRACT

The approach for managing the topology in a MANET includes, at the network layer of a wireless mobile node, operating a link state or other routing protocol to discover routes from the at least one wireless node to other wireless nodes within the MANET. The routing protocol includes the use of a global topology database storing global network topology information. The method also includes, at the network layer, providing the global network topology information from the global topology database of the routing protocol to the MAC sublayer. Also, at the data link layer, the MAC sublayer is controlled to perform neighbor connection management based upon the global network topology information from the global topology database. The approach may provide enhanced QoS, latency and resistance to link and node failures within MANETs.

18 Claims, 3 Drawing Sheets

(56) References Cited

OTHER PUBLICATIONS

Bejerano, "Taking the skeletons out of the closets: a simple and efficient topology discovery scheme for large ethernet LANs", IEEE/ACM Transactions on networking, vol. 17, No. 5, Oct. 2009, pp. 1385-1398.

McCloghrie et al., "Management information base for network management of TCP/IP-based internets: MIB-II; rfc 1213.txt", IETF Standard, Internet Engineering Task Force, Mar. 1991, pp. 1-70.

Nazir et al., "An efficient approach towards IP network topology discovery for large multi-subnet networks", Computers and Communications, Jun. 2006, pp. 1-5.

Pandey et al., "IP network topology discovery using SNMP", IEEE Information Networking International Conference, Jan. 2009, pp. 1-5.

Stott, SNMP-based layer-3 path discovery, Retrieved from the Internet: URL:http://www.google.de/url?sa=t&source=web&cd=1&sqi=2&ved=OCCMQFiAA&url=http%3A%2F%2Fciteseerx.ist.psu.edu%2Fviewdoc%2Fdownload%3Fdoi%3DI0.1.1.14.9759%26rep%3Drep1%26type%3Dpdf&rct=j&q=Snmp-based%20layer-3%20path%20discovery&ei=Ri7VTezYK5CgOpKTkPAL&usg=AFQjCNHp6LQoFoQARMfNggOGY7uoXh7p8A&cad=rja, May 2011, pp. 1-19.

\* cited by examiner

NETWORK LAYER TOPOLOGY MANAGEMENT FOR MOBILE AD-HOC NETWORKS AND ASSOCIATED METHODS

FIELD OF THE INVENTION

The present invention relates to the field of wireless communication networks, and, more particularly, to topology management and/or control in mobile ad-hoc networks (MANETs) and related methods.

BACKGROUND OF THE INVENTION

A mobile ad-hoc network includes a number of geographically distributed, potentially mobile nodes wirelessly connected by one or more radio frequency channels. Compared with other type of networks, such as cellular networks or satellite networks, the most distinctive feature of mobile ad hoc networks is the lack of fixed infrastructure. The network is formed of mobile nodes, and a network is created on the fly as the nodes transmit to or receive from other nodes. The network does not in general depend on a particular node and dynamically adjusts as some nodes join or others leave the network.

In an environment where a fixed communication infrastructure is unreliable or unavailable, such as in a natural disaster area struck by earthquake or hurricane, an ad hoc network can be quickly deployed and provide much needed communications. Ad hoc networks may allow people to exchange data in the field or in a classroom without using any network structure except the one they create by simply turning on their computers or PDAs.

As wireless communication increasingly permeates everyday life, new applications for mobile ad hoc networks will continue to emerge and become an important part of the communication structure. Mobile ad hoc networks may pose serious challenges to the designers. Due to the lack of a fixed infrastructure, nodes self-organize and reconfigure as they move, join or leave the network. All nodes could potentially be functionally identical and there may not be any natural hierarchy or central controller in the network. Many network-controlling functions are typically distributed among the nodes. Nodes are often powered by batteries and have limited communication and computation capabilities. The bandwidth of the system is usually limited. The distance between two nodes often exceeds the radio transmission range, and a transmission has to be relayed by other nodes before reaching its destination. Consequently, a MANET typically has a multi-hop topology, and this topology changes as the nodes move around.

The Mobile Ad-Hoc Networks (MANET) working group of the Internet Engineering Task Force (IETF) has been actively evaluating and standardizing routing, including multicasting, protocols. Because the network topology changes arbitrarily as the nodes move, information is subject to becoming obsolete, and different nodes often have different views of the network, both in time (information may be outdated at some nodes but current at others) and in space (a node may only know the network topology in its neighborhood usually not far away from itself).

A routing protocol desirably adapts to frequent topology changes and with less accurate information. Because of these unique requirements, routing in these networks is very different from others. Gathering fresh information about the entire network is often costly and impractical. Many routing protocols are reactive (on-demand) protocols: they collect routing information only when necessary and to destinations they need routes to, and do not generally maintain unused routes after some period of time. Accordingly, the routing overhead is greatly reduced compared to pro-active protocols which maintain routes to all destinations at all times. It may be important for a protocol to be adaptive. Ad Hoc on Demand Distance Vector (AODV), Dynamic Source Routing (DSR) and Temporally Ordered Routing Algorithm (TORA) are representative of on-demand routing protocols presented at the MANET working group.

Examples of other various routing protocols include Destination-Sequenced Distance Vector (DSDV) routing which is disclosed in U.S. Pat. No. 5,412,654 to Perkins, and Zone Routing Protocol (ZRP) which is disclosed in U.S. Pat. No. 6,304,556 to Haas. ZRP is a hybrid protocol using both pro-active and reactive approaches based upon distance from a source node. The Temporal Transition Network Protocol (TTNP), discussed in U.S. Pat. No. 6,754,192 assigned to the present assignee Harris Corp. of Melbourne, Fla., is another hybrid protocol that includes building and updating route tables at each node by managing and controlling the application of either proactive or reactive route discovery and their respective associated processes to define and maintain routes in the network based upon predicted route stability.

These conventional routing protocols typically use a best effort approach in selecting a route from the source node to the destination node. Typically, the number of hops is the main criteria (metric) in such a best effort approach. In other words, the route with the least amount of hops is selected as the transmission route.

Unlike fixed immobile networks, in a MANET a given node is presented with a changing set of neighbors from which a subset is selected and to which connections or links will be made. Current state of the art neighbor connection management algorithms typically use only local (two or three hop) link layer information. Commercial and government customers may need robust topologies and enhanced QoS in a dynamic mobile mesh. Accordingly, there is a need to enhance QoS, latency and resistance to link and node failures in such dynamic mobile networks.

SUMMARY OF THE INVENTION

In view of the foregoing background, it is therefore an object of the present invention to provide enhanced QoS, latency and resistance to link and node failures within MANETs.

This and other objects, features, and advantages in accordance with the present invention are provided by a method for managing the topology in a mobile ad hoc network (MANET) comprising a plurality of wireless nodes, the MANET operating in accordance with a multilayer protocol hierarchy including a network layer and a Data Link Layer that includes a Logical Link Control sublayer and a Media Access Control (MAC) sublayer at each wireless node. The method includes, at the network layer of at least one wireless node, operating a link state and/or other routing protocols to discover routes from the at least one wireless node to other wireless mobile nodes within the MANET. The network layer routing protocol may either be a link state or other routing protocol or any other routing protocol that includes the use of a persistent network layer database or global topology database storing global network topology information. The method also includes: at the network layer of the at least one wireless node, providing the global network topology information from the global topology database of the link-state or other routing protocol to the Data Link Layer; and at the Data Link layer of the at least one wireless node, controlling the MAC sublayer to perform neighbor connection management based upon a combination of the global network topology information from the network layer and local link state and connection information derived by the Data Link layer.

The multilayer protocol hierarchy of the MANET may include an application layer, and the method may further include, at the application layer of the at least one wireless node, operating a network management protocol to provide the global network topology information to the global topology database. The network management protocol may include a Management Information Base (MIB) to provide the global network topology information.

The network management protocol may be the Simple Network Management Protocol (SNMP). The routing protocol may be the Open Shortest Path First (OSPF) protocol. Routing protocol may also be the Open Shortest Path First (OSPF) with MANET extensions, Interior Gateway Routing Protocol (IGRP), Enhanced Interior Gateway Routing Protocol (EIGRP), Routing Information Protocol (RIP), Optimized Link State Routing (OLSR) protocol, Overlapping Relays (OR) protocol, a MANET Designated Routers (MDR) protocol and/or any other MANET routing protocol that maintains a persistent routing database that provides global topology information.

The MANET may be a Highband Networking Waveform (HNW) network. As such, at least some of the plurality of wireless mobile nodes may communicate within the MANET using directive beam antennas.

Another aspect of the present invention is directed to a mobile ad hoc network (MANET) including a plurality of wireless nodes, the MANET operating in accordance with a multilayer protocol hierarchy including a network layer and a Data Link Layer including a Logical Link Control sublayer and a Media Access Control (MAC) sublayer at each wireless node. Each wireless node comprises a controller and a wireless communications device cooperating therewith to: at the network layer, operate a link-state or other proactive routing protocol to discover routes to other wireless mobile nodes within the MANET, where such routes including relay hops through multiple nodes, the routing protocol including the use of a routing database storing global network topology information; at the network layer, provide the global network topology information from the routing database of the routing protocol to the Data Link layer; at the Data Link layer determining local neighborhood connectivity information such as node presence, node identity, active neighbor connections, link conditions, node locations, media access allocations, node mission priorities and/or other local link information and at the Data Link layer control the MAC sublayer to perform neighbor connection management based upon a combination of the global network topology information from the network layer and/or local neighborhood connectivity information from the Data Link layer of the wireless mobile node.

The multilayer protocol hierarchy may include an application layer, and the controller and wireless communications device may further cooperate, at the application layer, to operate a network management protocol to provide the global network topology information to the global topology database. Also, each of the plurality of wireless nodes may communicate within the MANET using a directive beam antenna.

An aspect of the invention is also directed to a wireless node for operation with a plurality of wireless nodes within a mobile ad-hoc network (MANET), the MANET operating in accordance with a multilayer protocol hierarchy including a network layer and a Data Link layer including a Logical Link Control sublayer and a Media Access Control (MAC) sublayer at each wireless node. The wireless node including a controller and a wireless communications device cooperating therewith to: at the network layer, operate a link-state or other MANET routing protocol to discover routes to other wireless nodes within the MANET, the routing protocol including the use of a network layer database storing global network topology information at the network layer, provide the global network topology information from the network layer database of the routing protocol to the Data Link layer; at the Data Link layer determining local neighborhood connectivity information such as node presence, node identity, active neighbor connections, link conditions, node locations, media access allocations, node mission priorities and/or other local link information and at the Data Link layer control the MAC sublayer to perform neighbor connection management based upon a combination of the global network topology information from the network layer and/or local neighborhood connectivity information from the Data Link layer of the wireless mobile node.

Again, the multilayer protocol hierarchy may include an application layer, and the controller and wireless communications device may further cooperate, at the application layer, to operate a network management protocol to provide the global network topology information to the global topology database. A directive beam antenna may cooperate with the wireless communications device to communicate within the MANET.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
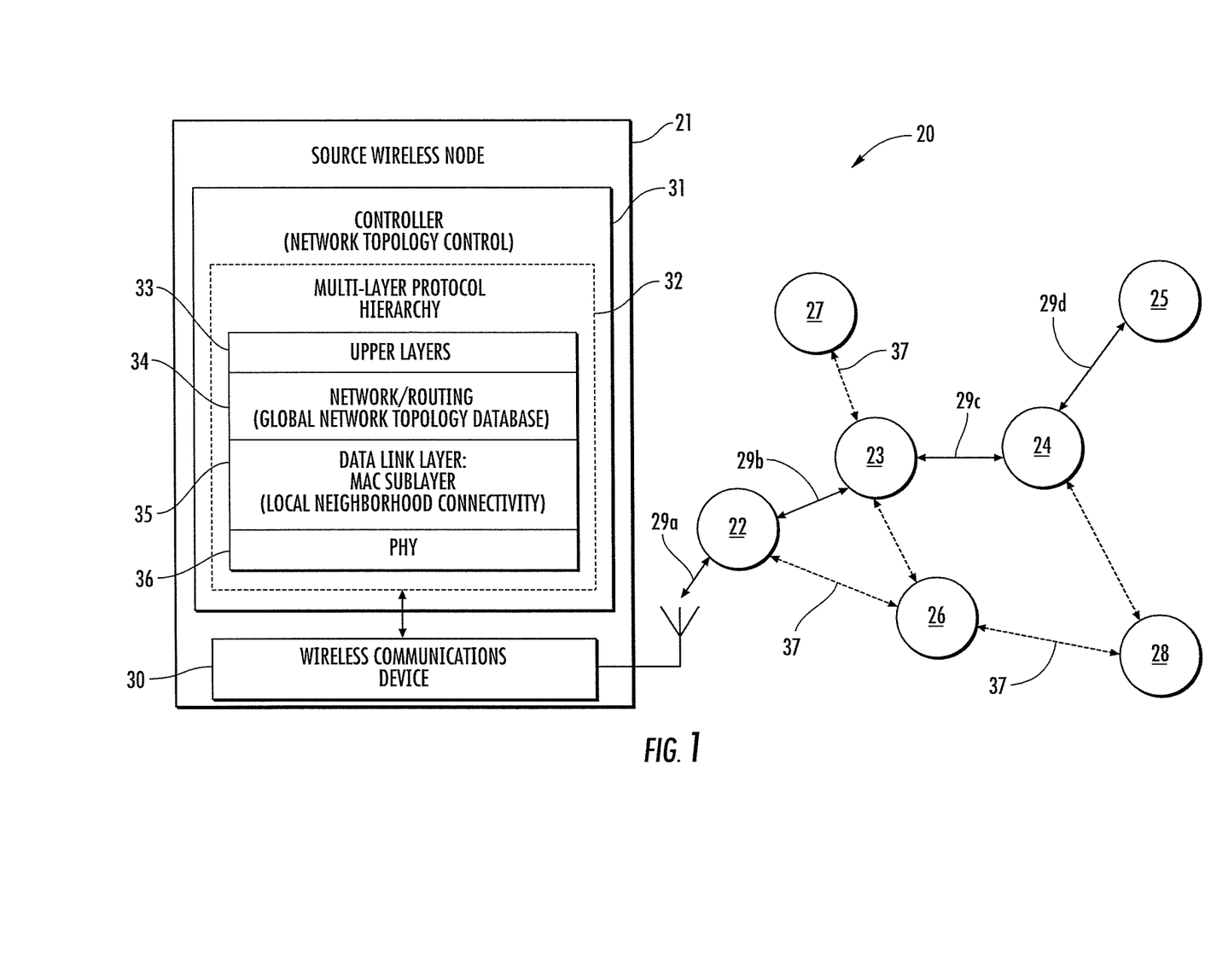
FIG. 1 is a schematic diagram illustrating a snapshot of a MANET and details of a mobile wireless node operating in accordance with network topology management features of the present invention.

Referring initially to FIG. 1, a snapshot of a MANET 20 in accordance with the present invention will now be described. The MANET 20 illustratively includes a plurality of nodes, such as mobile nodes 21-28. In the illustrated example, the mobile node 21 functions as a source node, while the mobile node 25 functions as a destination node with which the source node seeks to communicate. The nodes 21-28 may be any suitable type of wireless device or mobile device capable of communicating within a MANET such as radios, computers, personal data assistants (PDAs), etc., including a wireless communications device 30, for example, and other devices which will be appreciated by those of skill in the art. Of course, it will also be appreciated that certain of the nodes 21-28 may optionally be fixed and/or connected to a fixed communication infrastructure in some applications, if desired.

Information describing the node includes a node ID (IP address, ATM address, MAC address, etc.) and optionally, node priority information defining the importance of the node in conducting missions supported by the MANET. Examples of MANETs are set forth in commonly assigned U.S. Pat. Nos. 6,763,013 and 6,754,192; and U.S. Pat. Publication Nos. 2005/0053003 and 2004/0203820, the disclosures which are incorporated by reference in their entirety.

The source mobile node 21 further illustratively includes a controller 31, the operation of which will be described below. By way of example, the controller 31 may be implemented using a processor, memory, software, etc., as will be appreciated by those of skill in the art. Furthermore, the wireless communications device 30 may include wireless modems, wireless local area network (LAN) devices, cellular telephone devices, etc., as well as an associated antenna(s), as illustratively shown. By way of example, one or more phased array antennas or directive beam antennas (as well as other suitable antennas) may be used, as will be appreciated by those skilled in the art. It will further be understood that the other mobile nodes 22-28 also preferably include suitable wireless communications devices/controllers as well, which are not shown in FIG. 1 for clarity of illustration. It will also be understood by those skilled in the art that mobile wireless nodes may be operated when moving or at the halt and that in some cases such nodes are installed in a fixed installation that may not move. It will be appreciated that the presence of some fixed or temporarily halted wireless mobile nodes does not change the self-forming and dynamically adapting character of a MANET.

One function that the controller 31 performs is to establish one or more routes between the source mobile node 21 and the destination mobile node 25 for transferring data therebetween. A single route is illustratively shown in the exemplary embodiment using solid lines that pass through intermediate mobile nodes 22-24 and includes wireless communications links 29a-29d. It should be noted that while only a single route is shown for clarity of illustration, any number of routes may be used and it may typically be expected that one or more routes will be found between every pair of nodes in the MANET. Other connections or links 37 between nodes 22-28 also define a part of the MANET 20 neighbor connection topology and a complete set of all nodes and all neighbor connections in the MANET defines the global network topology. In addition, a MANET networking layer may optionally include the routes between nodes as global topology information.

As will be appreciated by those skilled in the art, MANET routes may include any number of intermediate nodes therein depending upon network size and proximity between the nodes, for example. Each intermediate node along a route is typically referred to as a "hop," thus routes passing through multiple intermediate nodes are sometimes referred to as "multi-hop" routes. It should be noted that while a relatively few number of intermediate nodes 22-24 are shown in the present example for clarity of illustration, the MANET 20 may include any number of nodes therein. Furthermore, it will be appreciated that portions of the route to the destination mobile node 25 could also include wired or fixed infrastructure. Also, the nodes 21-28 of the MANET 20 may define a wireless local area network (WLAN) that may define a part of a larger ad-hoc network including a plurality of WLANs.

It will also be appreciated that the way in which the controller 31 establishes routes will depend upon the particular MANET routing protocol being implemented in the MANET 20. As noted above, this may be done using proactive protocols that keep routing information continuously up to date, reactive protocols which discover routes on-demand when there is a need to send data to the destination mobile node 25, or by a combination thereof. Any suitable MANET protocols may be used to establish routes, such as those previously discussed above, for example. Any network layer routing function or associated network layer management and/or control function that discovers and/or maintains a database of global topology information may be used to provide the global topology information to the data link layer.

Data communications within MANETS typically follow the open system interconnection (OSI) architecture (or some variation thereof), as do other wireless networks (e.g., wireless LANs). By way of background, the OSI is a network protocol hierarchy which includes seven different control layers, namely (from highest to lowest) the application layer, presentation layer, session layer, transport layer, network layer, data link layer, and physical layer. In most systems the data link layer is further subdivided into a logical link control sublayer and a media access control (MAC) sublayer.

Generally, in the OSI model control data originating at some layer is passed down from one layer to the next at an originating node or terminal until it reaches the physical layer. For example data starting at the application layer is passed to the presentation layer, which passes it to the session layer and so on, proceeding to the physical layer. The data is then sent across the network, and when it reaches the destination terminal/node, it is processed in reverse order back up the hierarchy to the peer layer of the layer that originated the data. (e.g., from the physical layer to the application layer). As the data is passed through the layers, lower layers ignore the data content serving only as data conduits, so that only peer layers communicate with each other. Furthermore, data corresponding to each particular layer is typically organized in protocol data units (PDUs) referred to as packets at the network level. In the present invention the strict peer-to-peer layer hierarchy of the OSI model is not maintained so that the network layer communicates global topology data to the data link layer.

The controller 31 similarly operates in accordance with a multi-layer protocol hierarchy 32 to provide an integrated framework for operations. Generally, the multi-layer protocol hierarchy 32 may include a plurality of upper protocol layers 33 (e.g. application layer, presentation layer, session layer, transport layer), and a plurality of relatively lower protocol layers including a network or routing layer 34, a MAC or data link layer 35, and a physical or PHY layer 36.

The controller 31 and wireless communications device 30 cooperate, at the network layer 34, to operate a link-state or other routing protocol to discover routes to other wireless mobile nodes 22-28 within the MANET 20. Such a routing protocol includes the use of a global topology database storing global network topology information, as will be discussed in more detail below. The controller 31, at the network layer 34, provides the global network topology information from the global topology database of the routing protocol to the Data Link layer 35. Furthermore, the controller 31 and wireless communications device 30 cooperate, at the network layer 34, to control the data link layer 35 to perform neighbor connection management based upon the global network topology information from the global topology database.

Figure 2:
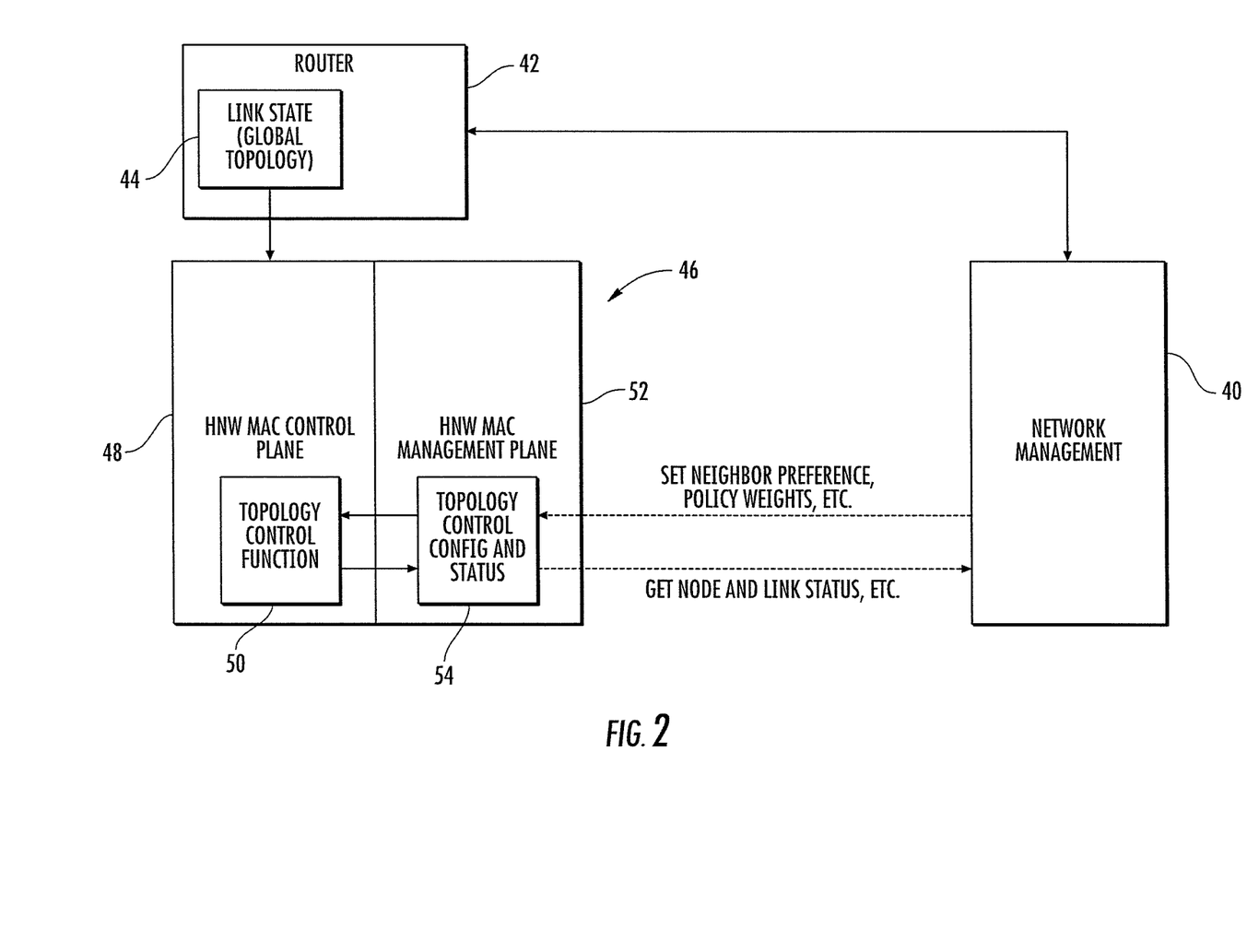
FIG. 2 is a schematic block diagram illustrating an architecture of the network management, router and media access control (MAC) in the mobile wireless node of FIG. 1.

Additional reference will be made to the schematic block diagram of FIG. 2 illustrating an architecture of the network management 40, routing or router 42 (e.g. in the network layer 34) and media access control (MAC) 46 (e.g. in the MAC sublayer of the data link layer 35) in the mobile wireless node 21 of FIG. 1. As discussed above, the multilayer protocol hierarchy may include an application layer, for example, in the upper layers 33, and the controller 31 may, at the application layer, operate a network management 40 protocol to provide the global network topology information to the global topology database 44 of the routing protocol or router 42.

The global network topology information is provided from the global topology database 44 of the network layer to the neighborhood connection management function of the data link layer MAC sublayer 46, which illustratively includes MAC control 48 having topology control 50, and MAC management 52 having topology control configuration and status 54. Furthermore, the controller 31 (e.g. via network management 40) and wireless communications device 30 cooperate, to control the MAC 46 to perform neighbor connection management, e.g. by providing access to node and link status information, and by setting neighbor preferences etc., based upon the global network topology information from the global topology database 44.

As will be discussed in more detail below, the network management protocol may include a Management Information Base (MIB) to provide the global network topology information; the network management protocol may be the Simple Network Management Protocol (SNMP); the routing protocol may preferably be a link-state routing protocol such as the Open Shortest Path First (OSPF) protocol; and the MANET may be a Highband Networking Waveform (HNW) network.

In addition to the OSPF routing protocol discussed above, the other possible link state routing protocols may include, but are not limited to, for example, OSPF protocol with MANET extensions, Interior Gateway Routing Protocol (IGRP), Enhanced Interior Gateway Routing Protocol (EIGRP), Routing Information Protocol (RIP), Optimized Link State Routing (OLSR) protocol, Overlapping Relays (OR) protocol, and MANET Designated Routers (MDR) protocol. Other routing protocols that are not link-state routing protocols may also be used, including but not limited to routing protocols based on fish-eye routing, zone routing, vector routing, and quality of service based routing. The desired feature of the routing protocol is that it and/or the associated network layer control and/or management discover and maintain a database of global topology information.

Open Shortest Path First (OSPF) is a dynamic routing protocol for use in Internet Protocol (IP) networks. Specifically, it is a link-state routing protocol and falls into the group of interior gateway protocols, operating within a single autonomous system (AS). It is defined as OSPF Version 2 in RFC 2328 (1998) for IPv4. The updates for IPv6 are specified as OSPF Version 3 in RFC 5340 (2008). OSPF is perhaps the most widely-used interior gateway protocol (IGP) in large enterprise networks.

OSPF is an interior gateway protocol that routes Internet Protocol (IP) packets solely within a single routing domain (autonomous system). It gathers link state information from available routers and constructs a topology map of the network. The topology determines the routing table presented to the Internet Layer which makes routing decisions based solely on the destination IP address found in IP datagrams. OSPF was designed to support variable-length subnet masking (VLSM) and Classless Inter-Domain Routing (CIDR) addressing models.

OSPF detects changes in the topology, such as link failures, very quickly and converges on a new loop-free routing structure within seconds. It computes the shortest path tree for each route using a method based on a shortest path first algorithm. Recent extensions to the standard OSPF routing protocol have been defined by the IETF and others to provide enhanced ability for OSPF to serve as the routing protocol in a MANET.

In OSPF, the link-state information is maintained on each router as a link-state database (LSDB) which is a tree-image of the entire network topology. Thus, the OSPF link-state database serves the purpose of a global topology database. Identical copies of the LSDB are periodically updated through flooding on all OSPF routers.

The OSPF routing policies to construct a route table are governed by cost factors (external metrics) associated with each routing interface. Cost factors may be the distance of a router (round-trip time), network throughput of a link, or link availability and reliability, expressed as simple unitless numbers. This provides a dynamic process of traffic load balancing between routes of equal cost.

Routers in the same broadcast domain or at each end of a point-to-point telecommunications link form adjacencies when they have detected each other. This detection occurs when a router identifies itself in a hello OSPF protocol packet. This is called a two way state and is the most basic relationship. OSPF uses both unicast and multicast to send "hello packets" and link state updates.

As a routing protocol, OSPF establishes and maintains neighbor relationships in order to exchange routing updates with other routers. The neighbor relationship table is called an adjacency database in OSPF. Provided that OSPF is configured correctly, OSPF forms neighbor relationships only with the routers directly connected to it. The routers that it forms a neighbor relationship with are in the same area as the interface with which it is using to form a neighbor relationship. An interface can only, typically, belong to a single area.

A management information base (MIB) stems from the OSI/ISO Network management model and is a type of database used to manage the devices in a communications network. It comprises a collection of objects in a (virtual) database used to manage entities (such as routers and switches) in a network.

Objects in the MIB are defined using a subset of Abstract Syntax Notation One (ASN.1) called "Structure of Management Information Version 2 (SMIv2)" RFC 2578. The software that performs the parsing is an MIB compiler.

The database is hierarchical (tree-structured) and entries are addressed through object identifiers. Internet documentation RFCs discuss MIBs, notably RFC 1155, "Structure and Identification of Management Information for TCP/IP based internets", and RFC 1213, "Management Information Base for Network Management of TCP/IP-based internets", and RFC 1157, "A Simple Network Management Protocol" (SNMP).

SNMP, a communication protocol between management stations, such as consoles, and managed objects (MIB objects), such as routers, gateways, and switches, makes use of MIBs. Components controlled by the management console use a so-called SNMP agent—a software module that can communicate with the SNMP manager.

SNMP uses a specified set of commands and queries. A MIB should contain information on these commands and on the target objects (controllable entities or potential sources of status information) with a view to tuning the network transport to the current needs. Examples of MIB objects include an output queue length and an Address Translation table. An example of a MIB is defined in RFC 3418 "Management Information Base (MIB) for the Simple Network Management Protocol (SNMP)".

The methods, systems and/or devices of the present embodiments may, for example, be used in connection with Highband Networking Waveform (HNW) system developed by Harris Corporation of Melbourne, Fla. which was created to provide high bandwidth, long range line-of-site connectivity between users of widely dispersed Local Area Networks (LANs). The HNW is an ad hoc (i.e., self-forming, self-healing) implementation of an IP-based wideband wireless network protocol using Directive Network Technology (DNT). DNT uses directive beam antennas to extend range and improve throughput.

HNW characteristics include ease of use, high throughput, long range on-the-move (OTM) and at-the-halt (ATH), secure, High Assurance Internet Protocol Encryptor (HAIPE) ready with Advanced Encryption Standard (AES) Transmission Security (TRANSEC) covers, standard network applications, seamless sensor support, interoperable with existing IPv4 networks, and also adheres to IPv6 open standards interface.

The HNW can be considered a wireless Wide Area Network (WAN) waveform that connects LANs and their users together. This waveform, which operates with equal effectiveness ATH or OTM, provides seamless, self-forming connectivity between all users. Although the waveform has primary applicability to the wide area scenario, it can be used to provide high data rate user access in localized areas where operational centers are numerous and data concentration is high.

HNW is a Software Communications Architecture (SCA) compliant waveform. From an architecture perspective, the HNW is formed at layers 1 and 2 in the OSI stack. Layer 2, which may also be referred to as a data link layer, for HNW is called the U-MAC (Universal Media Access Control) because it has been designed to universally link various routing (layer 3) and physical (layer 1) layers together. HNW interfaces with open architecture layer 3 routing protocols such as OLSR and OSPF with MANET extensions. HNW has two physical layers available including ASIC based OFDM modem and the SCA compliant VHDL based single carrier modem.

The HNW data link layer uses a MAC layer protocol that autonomously forms connections to other nodes in its immediate neighbourhood. However, it is not necessarily desirable to connect to all nodes in radio range, because excessive connections create undesirable overhead and interference, without necessarily improving the network performance. The HNW data link layer detects all other HNW nodes within its radio range and line-of-sight, and selects a subset of these nodes as link partners. The set of links presented to the router by the HNW charges as a function of the dynamics of the intervening RF environment including source node motion, destination node motion, and/or RF environment (blockage, fade, etc). The object of the HNW MAC neighbourhood connection management function is to select and maintain the subset of possible links that best achieves the network objectives as established by the network management policies. Prior art versions of the HNW neighbourhood connection management function performed this selection based strictly on local information determined by the HNW data link layer. This invention augments the local information with global topology information received by the data link layer neighbourhood connection management function from the network layer. This additional information is combined with the local information in the neighbourhood connection management function to make better decisions based on more complete of the network topology.

Those skilled in the art will appreciate that there are many methods known by which a processing system can combine information and utilize the combination to guide a decision making process. For example in the prior art HNW data plane MAC neighbourhood connection management function the local neighbourhood connectivity parameters detected by the data link layer and physical layer are combined in a weighted sum to form a link desirability score for each link and potential link in the neighbourhood. The weights are derived from network management policies provides by the network management application in the form of SNMP MIB parameters. The link desirability scores are compared to threshold values to determine when a link should be added or deleted from the neighbourhood and to determine which specific links should be formed or dropped.

In a preferred embodiment of the present invention, the network layer interface to the HNW is extended to provide access to the global topology database in the network layer. For example, the Point-to-Point Protocol over Ethernet (PPPoE) may be extended in RFC 4938 to provide a method for a data link layer to forward data to a network layer. In this embodiment, PPPoE is further enhanced to allow the HNW neighbourhood connection management function to read global topology information from the OSPF link-state database. In an alternate embodiment, global topology information may be entered into the HNW's SNMP MIB by a network management function so that the HNW neighbourhood connection management function can read the data from the MIB. Other methods for providing network layer global topology information to the data link layer neighborhood connection management function could also be used in alternative embodiments of this invention.

In a preferred embodiment, the HNW neighbourhood connection management function extracts appropriate global topology management parameters from the global topology database, weights them with network policy weights and adds them into the link desirability score described above in the neighbourhood connection management function. The enhanced desirability score is then compared to thresholds by the neighbourhood connection management function and links are formed or dropped depending on how the desirability score compares to the threshold values. Several different thresholds are used for different decision cases such as whether a link is to be formed to a newly discovered node, whether a new link should be formed to a node that has been known for some time, whether a link should be dropped, whether a link should be pre-empted as a more desirable link is possible and so forth. Examples of global topology information parameters that are useful for this purpose include but are not limited to: the number of different network layer routes that use a particular link, the number of nodes that are only reachable via routes that contain a particular link, the impact to total network throughput if a particular link is formed or dropped, the impact to average and/or maximum end-to-end latency if a particular link is either formed or dropped, the number of alternate routes that are lost or gained if a particular link is formed or dropped, the number of routes to a particular high priority node that use a particular link, the number of alternate routes gained or lost to a particular high priority node or set of high priority nodes if a particular link is formed or dropped, etc. Other global topology parameters may also be used to guide the neighbourhood connection management decisions In accordance with features of the present invention, the parameter weighting in the desirability score summation allows the neighbourhood connection management function to recognize the relative importance and reliability of various parameters. Importance is generally based on operator preferences embodied in network management policies. Reliability, however is a function of the parameter determination process. In this case, the weighting is defined to recognize that local data is generally more recent than global data and therefore provides a better indication of parameters subject to rapid change, whereas global parameter data is more likely to be stale, but provides a better indication of overall network status and long term trends. Therefore, the weighting will emphasize local parameters when rapid, quick response actions must be taken, and global topology parameters when establishing links to affect long term performance trends.

Those skilled in the art will appreciate that the weighted sum scoring method used in the HNW MAC neighbourhood connection management function is just one of a number of methods for combining data to guide a decision making process that could be used for this function.

Developed to provide true ad-hoc, mobile capabilities to network-centric communications, the Highband Networking Radio (HNR) utilizes directive beam technology to achieve higher throughput over longer distances and with enhanced spectrum efficiency. The HNR provides fully mobile, high-bandwidth, long-range, line-of-site connectivity between users of widely dispersed LANs. The versatile system can be configured for relatively small unit applications, as well as for larger network backbone applications. It operates with equal effectiveness in fixed or on-the-move applications. Designed for ease and speed of use, the HNR requires only a power-up to establish a mobile, ad-hoc networking mesh, helping to reduce manpower and simplify operations.

Standard components of the HNR include the Baseband Processing Unit (BPU) and Directive Beam Antenna. The lightweight BPU includes the processor that runs the Highband Network Waveform and a built-in router that runs the OSPF with MANET extensions or the EIGRP routing protocols. The BPU also provides an SNMP MIB for a network management interface. The Directive Beam Antenna can be mounted in a variety of configurations, including on top of a mast or integrated onto a vehicle roof. The radio also comes with control software and interconnection cables. Options for mobile applications include a precision, lightweight GPS receiver (PIRG) unit, an inertial navigation unit (INU), and a variety of self-erecting masts.

Figure 3:
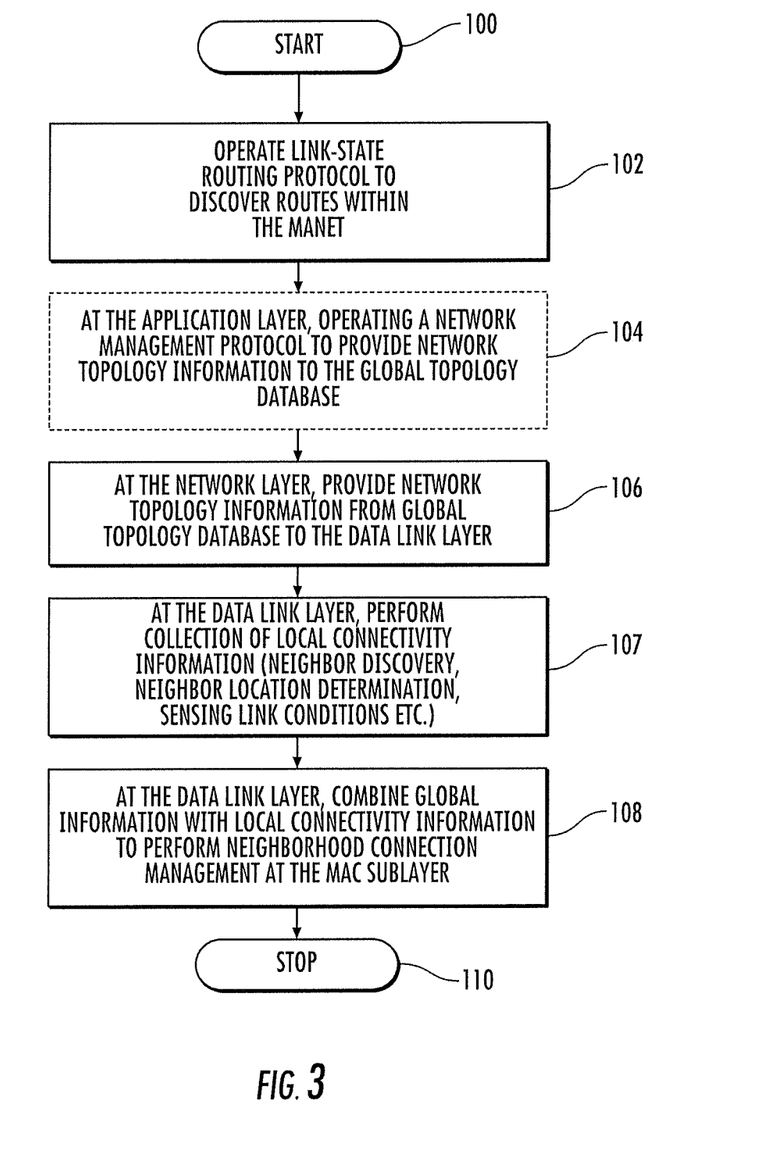
FIG. 3 is flowchart illustrating various steps in a method in accordance with the present invention.

A method aspect in accordance with the present approach will now be described with additional reference to the flowchart of FIG. 3. The method provides enhanced QoS, latency and resistance to link and node failures within MANETs. The method is for managing the topology in a mobile ad hoc network (MANET) 20 comprising a plurality of wireless mobile nodes 21-28. The MANET 20 operates in accordance with a multilayer protocol hierarchy including a network layer 34 and a data link layer with Media Access Control (MAC) sublayer 35 at each wireless mobile node. The method begins (block 100) and includes, at the network layer 34 of at least one wireless mobile node 21, operating a link state or other routing protocol (block 102) to discover routes from the at least one wireless mobile node 21 to other wireless mobile nodes 22-28 within the MANET 20. The routing protocol includes the use of a network or global topology database 44 storing global network topology information.

The method further includes (block 106) at the network layer 34 of the at least one wireless mobile node 21, providing the global network topology information from the global topology database 44 of the routing protocol to the data link MAC sublayer 35/46; block 107, at the data link layer, performing collection of local connectivity information (neighbor discovery, neighbor location determination, sensing link conditions etc.); and (block 108) controlling the MAC sublayer 35/46 to perform neighbor connection management based upon a combination of the global network topology information from the global topology database 44 and local neighborhood link connectivity information determined by the data link layer 35. The method may further include (block 104), at the application layer 33 of the wireless mobile node 21, operating a network management protocol 40 to provide the global network topology information to the global topology database or directly to the data link layer 44.

Current state of the art neighbor connection management algorithms typically use only local (two or three hop) link layer information. In the present approach, augmenting this local information with global topology information provides enhanced QoS, latency and resistance to link and node failures in dynamic mobile networks through the added access to area wide network layer topology information. Such distributed topology management for MANETs promotes self-forming, self-healing, peer-to-peer operation without losing the rapid response to change that is possible with distributed control based on local information.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for managing the topology in a mobile ad hoc network (MANET) comprising a plurality of wireless nodes, the MANET operating in accordance with a multilayer protocol hierarchy including a network layer and a data link layer having a Media Access Control (MAC) sublayer, at each wireless mobile node, the method comprising:
   at the network layer of at least one wireless node, operating a routing protocol to discover routes from the at least one wireless node to other wireless nodes within the MANET, the routing protocol including the use of a global topology database storing global network topology information;
   at the network layer of the at least one wireless node, providing the global network topology information from the global topology database of the routing protocol to the MAC sublayer; and
   at the data link layer of the at least one wireless node, controlling the MAC sublayer to perform neighbor connection management based upon at least the global network topology information from the global topology database.

2. The method according to claim 1 wherein the multilayer protocol hierarchy of the MANET includes an application layer; and further comprising, at the application layer of the at least one wireless mobile node, operating a network management protocol to provide the global network topology information to the global topology database.

3. The method according to claim 2 wherein the network management protocol includes a Management Information Base (MIB) to provide the global network topology information.

4. The method according to claim 3 wherein the network management protocol comprises the Simple Network Management Protocol (SNMP).

5. The method according to claim 1 wherein the routing protocol comprises at least one of Open Shortest Path First (OSPF) protocol, Open Shortest Path First (OSPF) with MANET extensions, Interior Gateway Routing Protocol (IGRP), Enhanced Interior Gateway Routing Protocol (EIGRP), Routing Information Protocol (RIP), Optimized Link state routing (OLSR) protocol, Overlapping Relays (OR) protocol, and MANET Designated Routers (MDR) protocol.

6. The method according to claim 1 wherein at least some of the plurality of wireless mobile nodes communicate within the MANET using directive beam antennas.

7. A mobile ad hoc network (MANET) comprising:
a plurality of wireless nodes, the MANET operating in accordance with a multilayer protocol hierarchy including a network layer and a data link layer having a Media Access Control (MAC) sublayer at each wireless node, and each wireless node comprising a controller and a wireless communications device cooperating therewith and configured to
at the network layer, operate a routing protocol to discover routes to other wireless nodes within the MANET, the routing protocol including a global topology database storing global network topology information,
at the network layer, provide the global network topology information from the global topology database of the routing protocol to the MAC sublayer, and
at the data link layer, control the MAC sublayer to perform neighbor connection management based upon at least the global network topology information from the global topology database.

8. The MANET according to claim 7 wherein the multilayer protocol hierarchy includes an application layer; and wherein the controller and wireless communications device further cooperate, and are configured, at the application layer, to operate a network management protocol to provide the global network topology information to the global topology database.

9. The MANET according to claim 8 wherein the network management protocol includes a Management Information Base (MIB) to provide the global network topology information.

10. The MANET according to claim 9 wherein the network management protocol comprises the Simple Network Management Protocol (SNMP).

11. The MANET according to claim 7 wherein the routing protocol comprises the Open Shortest Path First (OSPF) protocol.

12. The MANET according to claim 7 wherein each of the plurality of wireless nodes communicates within the MANET using a directive beam antenna.

13. A wireless node for operation with a plurality of wireless nodes within a mobile ad-hoc network (MANET), the MANET operating in accordance with a multilayer protocol hierarchy including a network layer and a data link layer having a Media Access Control (MAC) sublayer at each wireless node, the wireless node comprising:
a controller and a wireless communications device cooperating therewith, and configured to
at the network layer, operate a routing protocol to discover routes to other wireless nodes within the MANET, the routing protocol including a global topology database storing global network topology information,
at the network layer, provide the global network topology information from the global topology database of the routing protocol to the MAC sublayer, and
at the data link layer, control the MAC sublayer to perform neighbor connection management based upon at least the global network topology information from the global topology database.

14. The wireless node according to claim 13 wherein the multilayer protocol hierarchy includes an application layer; and wherein the controller and wireless communications device further cooperate, at the application layer, to operate a network management protocol to provide the global network topology information to the global topology database.

15. The wireless node according to claim 14 wherein the network management protocol includes a Management Information Base (MIB) to provide the global network topology information.

16. The wireless node according to claim 15 wherein the network management protocol comprises the Simple Network Management Protocol (SNMP).

17. The wireless node according to claim 13 wherein the routing protocol comprises the Open Shortest Path First (OSPF) protocol.

18. The wireless node according to claim 13 further comprising a directive beam antenna cooperating with the wireless communications device to communicate within the MANET.

* * * * *